(12) United States Patent
Dougan

(10) Patent No.: US 9,487,096 B2
(45) Date of Patent: Nov. 8, 2016

(54) CHARGING DEVICE

(71) Applicant: Komatsu Ltd., Tokyo (JP)

(72) Inventor: Yoshihiro Dougan, Oyama (JP)

(73) Assignee: Komatsu Ltd., Tokyo (JP)

( * ) Notice: Subject to any disclaimer, the term of this patent is extended or adjusted under 35 U.S.C. 154(b) by 66 days.

(21) Appl. No.: 14/123,831

(22) PCT Filed: Aug. 2, 2013

(86) PCT No.: PCT/JP2013/071065
§ 371 (c)(1),
(2) Date: Dec. 4, 2013

(87) PCT Pub. No.: WO2015/015648
PCT Pub. Date: Feb. 5, 2015

(65) Prior Publication Data
US 2015/0217651 A1    Aug. 6, 2015

(51) Int. Cl.
*H02J 7/00* (2006.01)
*B60L 11/18* (2006.01)
*H02J 7/04* (2006.01)

(52) U.S. Cl.
CPC .............. *B60L 11/1809* (2013.01); *H02J 7/00* (2013.01); *H02J 7/04* (2013.01); *Y02T 10/7005* (2013.01)

(58) Field of Classification Search
CPC ... Y02T 90/14; Y02T 90/128; Y02T 90/163; Y02T 10/7005; Y02T 10/7088; Y02E 60/12; H02J 7/0004; H02J 7/0006; H01M 10/48; H01M 10/4257
USPC .................................................. 320/109, 106
See application file for complete search history.

(56) References Cited

U.S. PATENT DOCUMENTS 6,137,250 A * 10/2000 Hirano ..................... B60K 6/46
                                                                      180/65.245
8,694,185 B2    4/2014 Sakamoto et al.
9,102,238 B2    8/2015 Ohtomo
(Continued)

FOREIGN PATENT DOCUMENTS

CN    102248895 A    11/2011
CN    102315666 A    1/2012
(Continued)

OTHER PUBLICATIONS

Office Action dated Aug. 3, 2015 issued for corresponding German Patent Application No. 11 2013 000 095.4.
(Continued)

*Primary Examiner* — Richard Isla Rodas
*Assistant Examiner* — Mohammed J Sharief
(74) *Attorney, Agent, or Firm* — Locke Lord LLP

(57)    ABSTRACT

A charging device 2 is a device for charging a battery 30 of a battery-type forklift 1 provided with the battery and at least one motor, the motor driven by the power supplied from the battery. The charging device 2 includes: a power conversion unit 73 that converts an alternating-current power to direct-current power, a control unit 70 that controls charging of the battery 30 based on an instruction from an in-vehicle control device 60 mounted on the battery-type forklift 1, a feed terminal that supplies the direct-current power to the battery 30, a communication terminal for communicating with the battery-type forklift 1, and a startup terminal for transmitting a signal for staring up the in-vehicle control device 60.

2 Claims, 12 Drawing Sheets

(56) References Cited

U.S. PATENT DOCUMENTS

| | | | |
|---|---|---|---|
| 2001/0009027 A1* | 7/2001 | Shiga | G06F 1/26 |
| | | | 713/300 |
| 2002/0157881 A1* | 10/2002 | Bakholdin | B60K 6/24 |
| | | | 180/65.245 |
| 2009/0071428 A1* | 3/2009 | Kamiyama | B60H 1/00314 |
| | | | 123/142.5 R |
| 2010/0315040 A1* | 12/2010 | Sakurai | 320/109 |
| 2011/0288705 A1 | 11/2011 | Kawasaki et al. | |
| 2012/0004798 A1 | 1/2012 | Sakamoto et al. | |
| 2012/0126754 A1 | 5/2012 | Akahane et al. | |
| 2012/0293114 A1 | 11/2012 | Murochi et al. | |
| 2013/0127413 A1* | 5/2013 | Ohtomo | B60L 3/003 |
| | | | 320/109 |
| 2013/0162208 A1 | 6/2013 | Ohnuki | |
| 2013/0342008 A1* | 12/2013 | Takata et al. | 307/9.1 |

FOREIGN PATENT DOCUMENTS

| | | |
|---|---|---|
| CN | 103119823 A | 5/2013 |
| CN | 103124092 A | 5/2013 |
| JP | 06-343203 A | 12/1994 |
| JP | 07-212982 A | 8/1995 |
| JP | 2004032869 A | 1/2004 |
| JP | 2010239850 A | 10/2010 |
| JP | 2011-019330 A | 1/2011 |
| JP | 2011-142704 A | 7/2011 |
| JP | 2012-016163 A | 1/2012 |
| JP | 2013027204 A | 2/2013 |
| JP | 2013-143813 A | 7/2013 |

OTHER PUBLICATIONS

International Search Report dated Sep. 10, 2013, issued for PCT/JP2013/071065.

* cited by examiner

CHARGING DEVICE

FIELD

The present invention relates to a charging device that charges a battery of a battery-type work vehicle that mounts the battery and travels by a motor driven by the power supplied from the battery.

BACKGROUND

There are work vehicles equipped with a motor used for traveling, and supplying power to the motor from a battery to travel. Such a work vehicle is required to charge the battery with a charging device when the power stored in the battery has been consumed. For example, Patent Literature 1 discloses a charging system in which a base station provided with a charging device manages charging of a battery of the worker.

CITATION LIST

Patent Literature

Patent Literature 1: Japanese Laid-open Patent Publication No. 2011-142704

SUMMARY

Technical Problem

By the way, when the battery mounted on the work vehicle is quickly charged, the current given to the battery becomes large. As a result, the heating value of the charging device becomes large. A radiator for discharging heat generated by the charging device is increased in size, and it is necessary to forcibly cool the charging device with a fan and the like. Therefore, the charging device may be increased in size.

An objective of the present invention is to suppress the increase in size of a vehicle and to perform management of a battery in a battery-type work vehicle.

Solution to Problem

According to the present invention, a charging device for charging a battery of a work vehicle provided with the battery and at least one motor, the motor being driven by power supplied from the battery, the charging device comprises: a power conversion unit configured to convert alternating-current power to direct-current power; a control unit configured to control charging of the battery based on an instruction from an in-vehicle control device mounted on the work vehicle; a feed terminal configured to supply the direct-current power to the battery; a communication terminal for communicating with the work vehicle; and a startup terminal for transmitting a signal for starting up the in-vehicle control device.

In the present invention, it is preferable that the feed terminal, the communication terminal, and the startup terminal are arranged in a same connector.

Advantageous Effects of Invention

The present invention can suppress the increase in size of a vehicle and can perform management of a battery in a battery-type work vehicle.

DESCRIPTION OF EMBODIMENTS

Modes for implementing the present invention (embodiments) will be described in detail with reference to the drawings.

Figure 1:
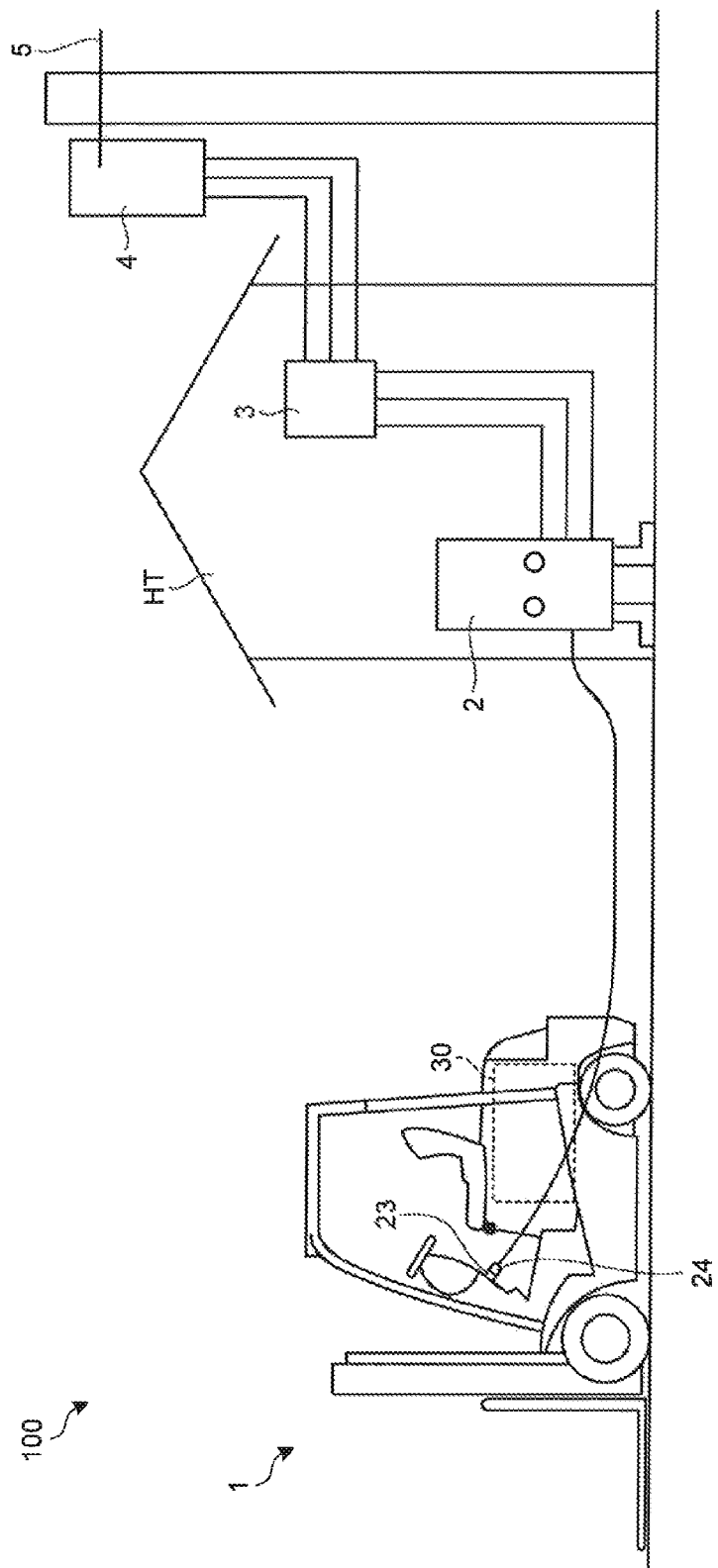
FIG. 1 is a diagram illustrating a work vehicle charging system according to the present embodiment.

FIG. 1 is a diagram illustrating a work vehicle charging system according to the present embodiment. In the present embodiment, a battery-type forklift 1 will be described as an example of a work vehicle. However, the work vehicle is not limited to the battery-type forklift 1. For example, the work vehicle may be a wheel loader, an excavator, or the like driven by the power obtained by a generator driven by the power from a battery or by an engine.

A work vehicle charging system 100 includes a battery-type forklift 1 and a charging device 2. The battery-type forklift 1 is a battery-type work vehicle provided with a battery 30 as a work vehicle battery and at least one motor driven by the power supplied from the battery 30. The at least one motor is, for example, a motor for causing the battery-type forklift 1 to travel. The charging device 2 is a stationary device disposed in a building HT or under the eaves of the building HT. A three-phase alternating current is supplied to the charging device 2 from a switch board 3 in the building HT. The charging device 2 can quickly charge the battery 30 of the battery-type forklift 1. Alternating-current power is supplied to the switch board 3 from a pole transformer 4, for example. The alternating-current power is supplied to the pole transformer 4 from a substation through a power line 5. In the battery-type forklift 1, a charging device-side connector 24 of the charging device 2 is connected to a charging connector 23 during a rest time, for example, and the battery 30 is charged. In a case of using a rest time, the battery 30 is quickly charged.

Figure 2:
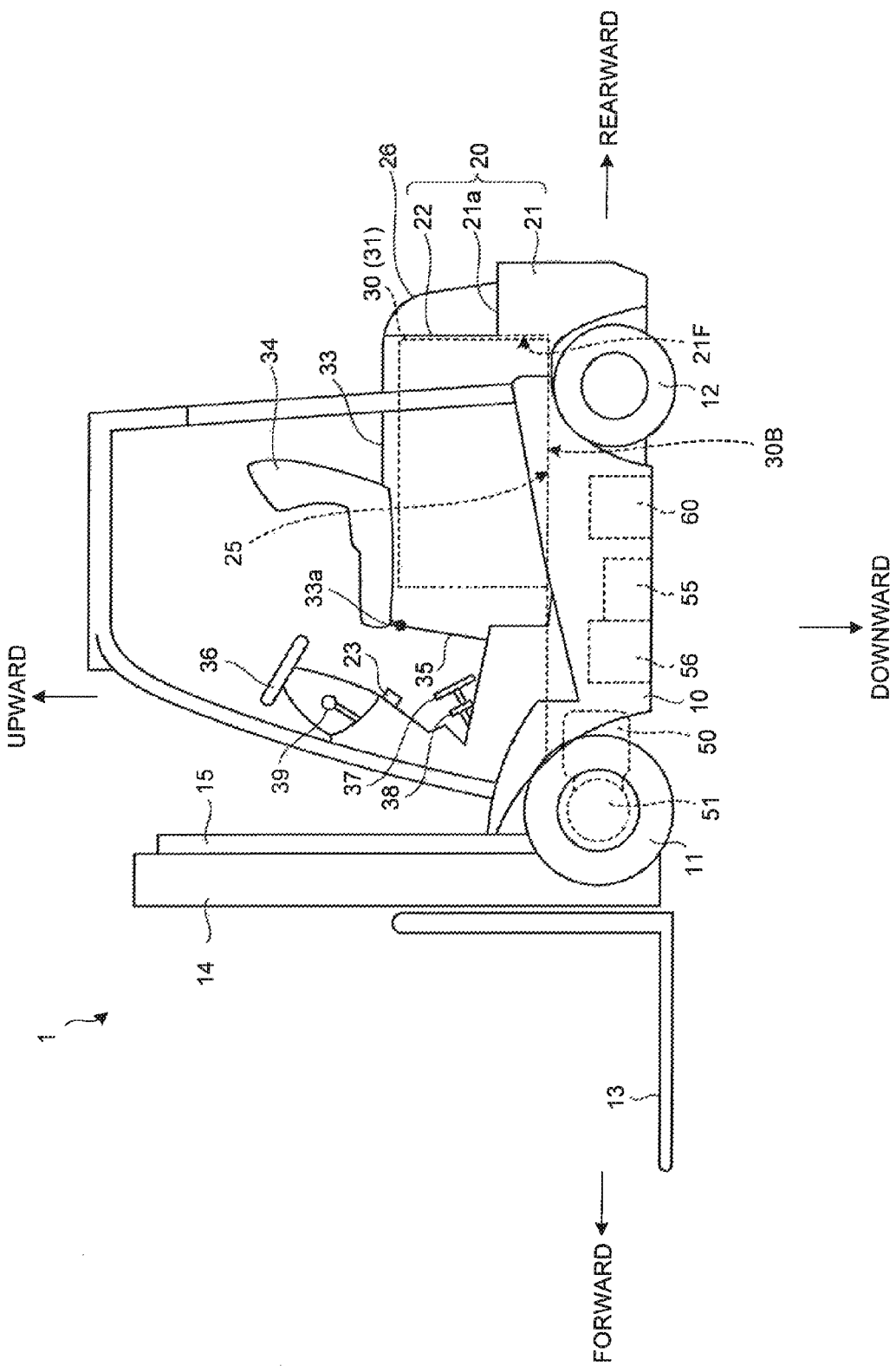
FIG. 2 is a side view illustrating a state of a battery-type forklift according to the present embodiment as viewed from the left side.
Figure 3:
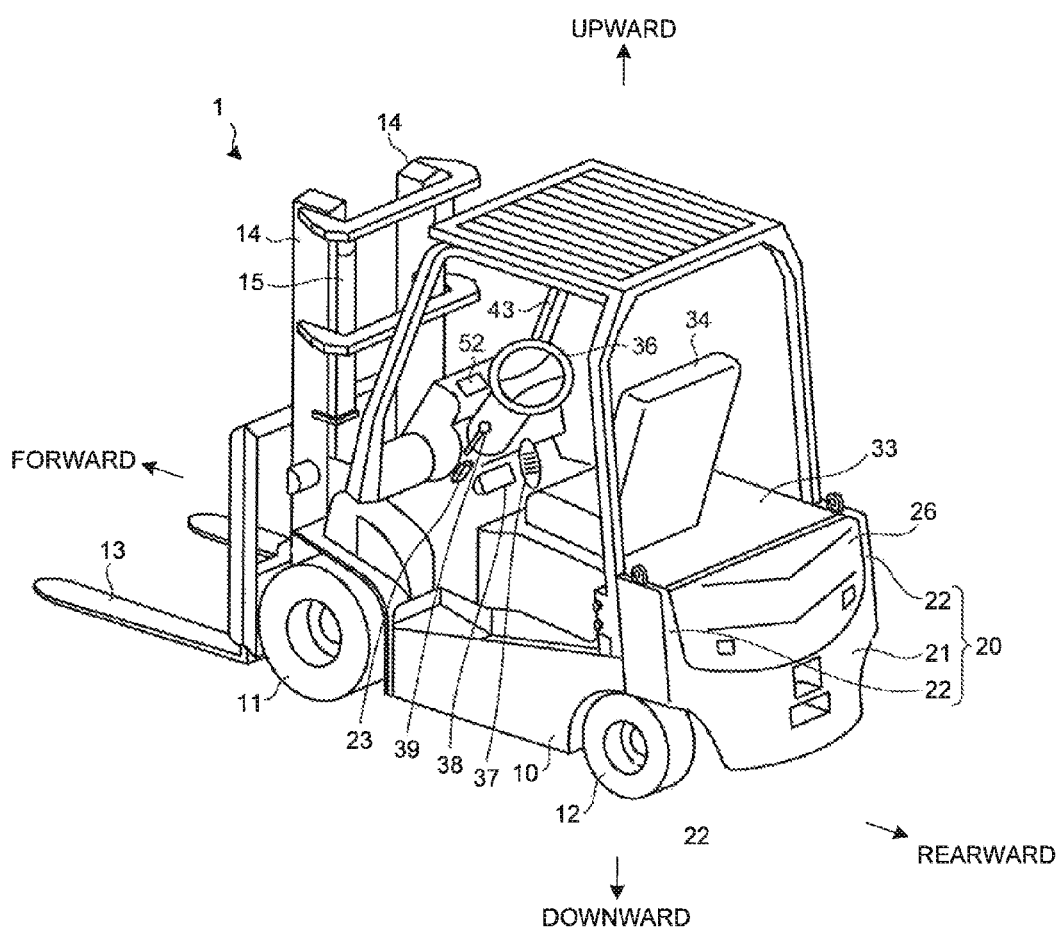
FIG. 3 is a perspective view illustrating a state of the battery-type forklift according to the present embodiment as viewed from an obliquely left rear upper side.

FIG. 2 is a side view illustrating a state of the battery-type forklift according to the present embodiment as viewed from the left side. FIG. 3 is a perspective view illustrating a state of the battery-type forklift according to the present embodiment as viewed from an obliquely left rear upper side. Hereinafter, in the battery-type forklift 1, the side where a fork 13 is provided is a forward side, and the side where a counter weight 20 is provided is a rearward side. In a case where the work vehicle is not a battery-type forklift, the side from a driver's seat 34 toward a handle 36 as an operation device is the forward side, and the side from the handle 36 toward the driver's seat 34 is the rearward side. The operation device includes an operation lever for operating a working machine in an excavator, a wheel loader, or the like, other than the handle 36 used for steering of the work vehicle.

In the present embodiment, right and left means right and left with respect to the front. A right and left direction is a width direction of a vehicle body 10 as a main body of the work vehicle. An upward side is a side perpendicular to a plane (ground plane) contacting with at least three of front wheels 11 and rear wheels 12, and from the ground plane toward a rotation center shaft of the front wheels 11 or of the rear wheels 12. A downward side is a side from the rotation center shaft of the front wheels 11 or of the rear wheels 12 toward the ground plane. An axis toward a front and rear direction of the vehicle body 10 and passing through a width direction center of the vehicle body 10 is a front and rear axis, and an axis perpendicular to the front and rear axis, parallel with the disposition plane, and toward the right and left direction of the vehicle body 10 is a right and left axis. An axis toward a vertical direction of the vehicle body 10 is a vertical axis. The vertical axis is perpendicular to both of the front and rear axis and the right and left axis. Hereinafter, a plane view refers to a state as viewed from an upward side.

<Overall Configuration of Battery-Type Forklift Truck 1>

The battery-type forklift 1 includes the front wheels 11 respectively provided at front corner portions of the vehicle body 10, and the rear wheels 12 provided at rear corner portions of the vehicle body 10. The battery-type forklift 1 travels with the front wheels 11 being driven by a traveling motor 50 provided posterior to the front wheels 11. To be specific, an output of a traveling motor 50 is transmitted to both of the front wheels 11 and 11 through a power transmission device 51 having a deceleration function.

In the present embodiment, as the traveling motor 50, a permanent magnet-type (PM) motor, that is, a motor in which a rotor has a permanent magnet can be used, for example. When the PM-type motor is used as the traveling motor 50, a surface permanent magnet-type (SPM) motor or an interior permanent magnet-type (IPM) motor may be employed.

The fork 13 for loading/unloading or moving a load is provided anterior to the vehicle body 10. The fork 13 is supported by a mast 14 provided along the vertical direction. The fork 13 moves up and down along the mast 14 by driving of a mast cylinder 15 provided between the fork 13 and the mast 14. Although not illustrated in the drawing, a lower end portion of the mast 14 is rotatably attached to the vehicle body 10 around the right and left axis. Further, the mast 14 includes a tilt cylinder (not illustrated) between the mast 14 and the vehicle body 10. The mast 14 can take a forward-bent posture or a backward-bent posture with respect to the vehicle body 10 by driving of the tilt cylinder.

The counter weight 20 is provided at a rear end part of the vehicle body 10. In this way, the battery-type forklift 1 is a counter balance-type forklift. However, the battery-type forklift 1 is not limited thereto. The counter weight 20 is a weight for balancing a weight when the fork 13 supports a load. As the counter weight 20, metal is used, for example. However, the counter weight 20 is not limited thereto. The counter weight 20 is arranged from a portion above the rear wheels 12 to a rear end portion in the vehicle body 10.

The battery-type forklift 1 includes an acceleration pedal 37, a brake pedal 38, and a traveling direction switching lever 39. The acceleration pedal 37 is an operation member that controls an output and a rotating direction of the traveling motor 50. The brake pedal 38 is an operation member for stopping the battery-type forklift 1. The traveling direction switching lever 39 is an operation member for switching the traveling direction of the battery-type forklift 1 either in a forward direction or in a backward direction. The battery-type forklift 1 includes the charging connector 23. The charging device-side connector 24 of the charging device 2 illustrated in FIG. 1 is connected to the charging connector 23 when the battery 30 is charged. A cover is attached to the charging connector 23 for waterproofing when the charging device-side connector 24 is not connected.

As illustrated in FIG. 3, the battery-type forklift 1 includes a display panel 52 as a display device in front of the handle 36. The display panel 52 includes an input unit for performing various types of setting with respect to the battery-type forklift 1 and a display unit displaying information related to a state of the battery-type forklift 1 and the like. An operator of the battery-type forklift 1 performs various types of setting with respect to the battery-type forklift 1 through the display panel 52. Examples of the information related to the state of the battery-type forklift 1 to be displayed in the display unit of the display panel 52 includes, for example, a state of the battery 30, a hydraulic pressure of a hydraulic oil supplied to the mast cylinder 15, and the like. The hydraulic oil is supplied from a hydraulic pump 56 driven by a cargo motor 55 described below. An in-vehicle control device 60 controls the traveling motor 50 and the cargo motor 55.

<Electrical System ES of Battery-Type Forklift Truck 1>

Figure 4:
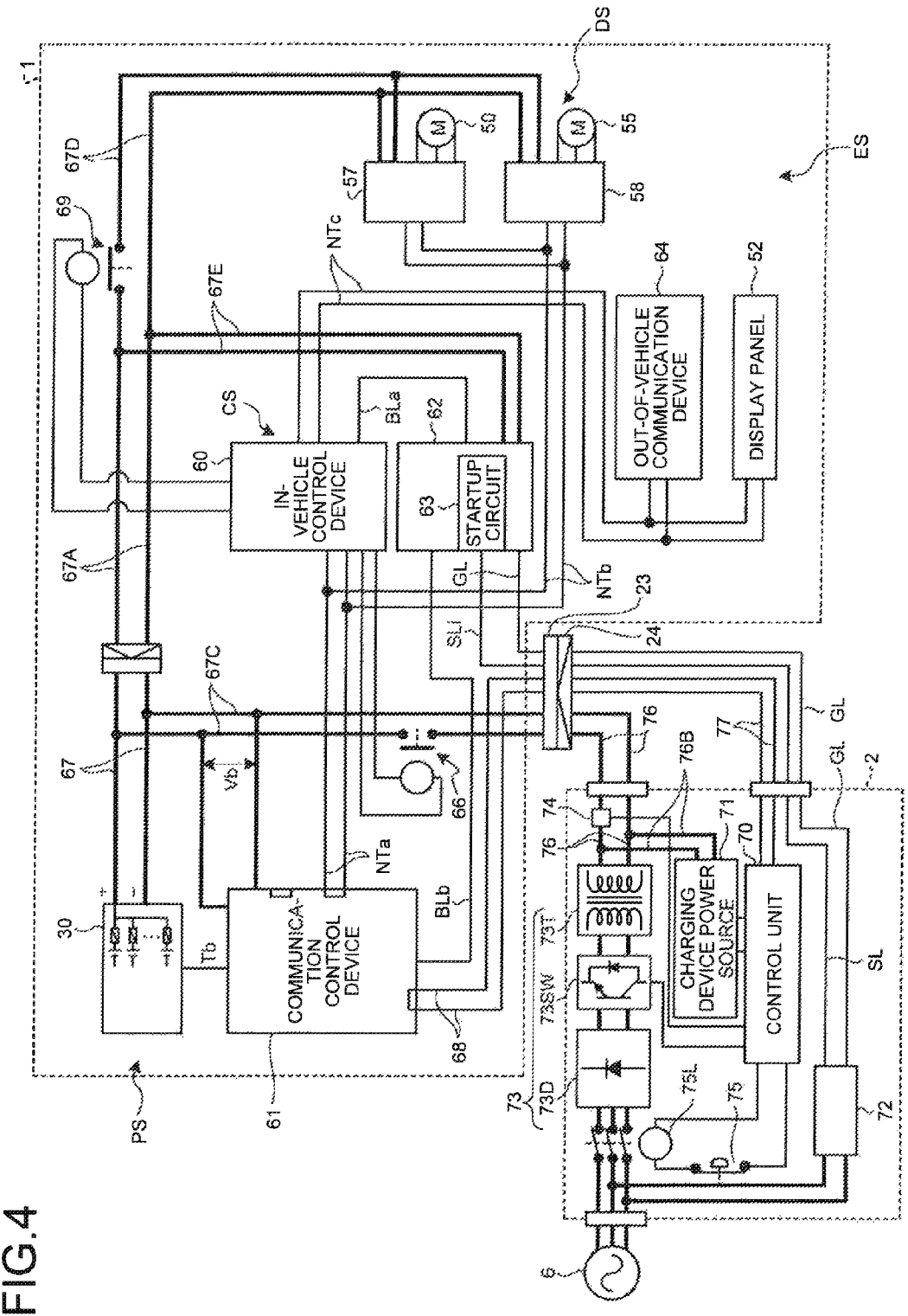
FIG. 4 is a block diagram for describing an electrical system of the battery-type forklift according to the present embodiment.

FIG. 4 is a block diagram for describing an electrical system of the battery-type forklift according to the present embodiment. The electrical system ES of the battery-type forklift 1 includes a control system CS, a power supply system PS, and a drive system DS. The control system CS is configured from devices for controlling the battery-type forklift 1. The control system CS includes an in-vehicle control device 60, a communication control device 61, an out-of-vehicle communication device 64, and a display panel 52. The in-vehicle control device 60 is called master controller, and a computer is used, for example. The in-vehicle control device 60 controls the traveling motor 50, and the cargo motor 55 included in the battery-type forklift 1. To be specific, the in-vehicle control device 60 controls the traveling motor 50 through a traveling inverter 57, and controls the cargo motor 55 through a cargo inverter 58. Other than above, the in-vehicle control device 60 controls display of the display panel 52, controls communication between the out-of-vehicle communication device 64 and a management facility outside the vehicle, and monitors a state of the battery 30. In this way, the in-vehicle control device 60 controls the overall battery-type forklift 1.

The communication control device 61 mainly functions as an interface that mediates communication between the in-vehicle control device 60 and the charging device 2 provided outside the battery-type forklift 1. A communication line 68 for communicating with the charging device 2 is connected to the communication control device 61. Other than the above, the communication control device 61 detects a temperature Tb of the battery 30 and a voltage between terminals Vb, and transmits the temperature Tb and the voltage Vb to the in-vehicle control device 60. The out-of-vehicle communication device 64 is a device for performing radio communication and the like with an outside of the battery-type forklift 1, for example, with a management facility, and the like. The display panel 52 is controlled by the in-vehicle control device 60, and displays information related to a state of the battery-type forklift 1, for example, a hydraulic oil pressure or a residual quantity of the battery 30. The display panel 52 includes an input unit as described above. An operator of the battery-type forklift 1 can execute a predetermined function of the battery-type forklift 1 using the display panel 52. In the present embodiment, the operator can execute a function to control the charging device 2 included in the in-vehicle control device 60 through the display panel 52.

The in-vehicle control device 60 is connected with the communication control device 61, the out-of-vehicle communication device 64, and the display panel 52 through communication line S NTa and NTc. The in-vehicle control device 60 exchanges information with the communication control device 61, the out-of-vehicle communication device 64, and the display panel 52 through the communication line S NTa and NTc. Further, the in-vehicle control device 60 is connected with the traveling inverter 57 and the cargo inverter 58 through the communication lines NTa and NTb. The in-vehicle control device 60 controls the traveling inverter 57 and the cargo inverter 58 through the communication line S NTa and NTb to control the operation of the traveling motor 50 and the cargo motor 55. In addition, the in-vehicle control device 60 controls the charging device 2 when the battery 30 is charged.

The power supply system PS supplies the power to be used by the battery-type forklift 1. The power supply system PS includes the battery 30 and a power source device 62. The battery 30 is a direct-current power source that supplies direct-current power. The battery 30 supplies the power to the devices that consume the power through a power line 67. Further, the battery 30 receives charging from the charging device 2 through the power line 67. The above-described voltage between terminals Vb is a voltage between the power lines 67. The power source device 62 receives the power from the battery 30 through power lines 67, 67A, and 67E, and transforms the voltage (lowers the voltage in the present embodiment), and supplies the voltage to the in-vehicle control device 60 and the communication control device 61 through the wirings BLa and BLb. The power source device 62 is, for example, a DC-DC converter. The power source device 62 includes a startup circuit 63. In addition, a signal line in vehicle SLi and a ground line GL are connected to the power source device 62. The signal line in vehicle SLi is a signal line for transmitting a signal from the charging device 2 to the startup circuit 63.

A charging electric wire 67C used for charging the battery 30 from the charging device 2 is branched from the power line 67 of the battery 30. The charging electric wire 67C includes a contactor 66 as a switch in the middle of the charging electric wire 67C. The contactor 66 is provided between a terminal of the battery 30 and a charging terminal included in the charging connector 23. The contactor 66 is controlled by the in-vehicle control device 60. When the battery 30 is charged, the contactor 66 is in a conductive state (closed state or ON state) by the in-vehicle control device 60. When the battery 30 is not charged, the contactor 66 is in a non-conductive state (opened state or OFF state) by the in-vehicle control device 60.

The drive system DS causes the battery-type forklift 1 to drive, or drives the hydraulic pressure pump 56 to cause the fork 13 to move up and down. The drive system DS includes a traveling inverter 57, a cargo inverter 58, the traveling motor 50, and the cargo motor 55. The power is supplied to the traveling inverter 57 and the cargo inverter 58 from the battery 30 through the power lines 67, 67A, and 67D. A contactor 69 as a switch is provided in the power line 67D. The contactor 69 is controlled by the in-vehicle control device 60. When the battery-type forklift 1 is in operation, the contactor 69 is in the conductive state, and the power is supplied to the traveling inverter 57 and the cargo inverter 58 from the battery 30. The contactor 69 is in the non-conductive state when the battery-type forklift 1 is suspended, that is, when the battery 30 is charged, for example.

The charging electric wire 67C, the communication line 68, the signal line in vehicle SLi, and the ground line GL are put together to the single charging connector 23, and are connected to the charging device-side connector 24 of the charging device 2. Next, the charging device 2 will be described.

<Electrical System of Charging Device 2>

The charging device 2 includes a control unit 70, a charging device power source 71, a startup signal generation unit 72, and a power conversion unit 73. The charging device 2 can communicate with the battery-type forklift 1. The control unit 70 is, for example, a computer, and controls charging of the battery 30 based on an instruction from the in-vehicle control device 60 of the battery-type forklift 1. For example, the control unit 70 controls the current or voltage of the direct-current power supplied to the battery 30 based on the instruction transmitted from the in-vehicle control device 60 for charging the battery 30. The instruction for charging the battery 30 from the in-vehicle control device 60 is input to the control unit 70 through a communication line 77. The charging device power source 71 transforms the power supplied from the battery 30 mounted on the battery-type forklift 1 (lowers the voltage in the present embodiment), and supplies the voltage to the control unit 70. The power is supplied to the charging device power source 71 through a feeder line 76 and through a power line 76B branched from the feeder line 76. The control unit 70 is operated by the power supplied from the charging device power source 71. In the present embodiment, the charging device power source 71 is, for example, a DC-DC converter.

The startup signal generation unit 72 generates a signal (hereinafter, appropriately referred to as startup signal) for starting up the in-vehicle control device 60, and transmits the signal to the power source device 62 of the battery-type forklift 1 through the signal line SL. The startup signal generation unit 72 is connected to an alternating-current power source 6 that is a three-phase alternating-current power source. The startup signal generation unit 72 outputs a direct-current voltage having a constant size as long as a single-phase direct current is input from the alternating-current power source 6. That is, the startup signal generation unit 72 is an AC-DC converter.

The power conversion unit 73 includes a diode 73D, a switching element 73SW, and a rectification unit 73T. The diode 73D rectifies the three-phase alternating current from the alternating-current power source 6. The switching element 73SW is subjected to constant current control so that the charging device 2 outputs a current having a constant value by being turned ON-OFF by the control unit 70 at a predetermined timing. The rectification unit 73T includes a transformer, and transforms and outputs the current output from the switching element 73SW (lowers the voltage in the present embodiment). The direct-current power output from the charging device 2 is output to the feeder line 76. A sensor 74 for detecting the current and voltage is attached to the feeder line 76. The control unit 70 controls the operation of the switching element 73SW so that at least one of the voltage and the current of the direct-current power output from the charging device becomes a predetermined value instructed by the in-vehicle control device 60 based on at least one of a voltage value and a current value detected by the sensor 74.

An emergency stop switch 75 and a coil 75L are connected to the control unit 70. When the emergency stop switch 75 is operated, the control unit 70 stops charging. In the present embodiment, the feeder line 76, the communication line 77, the signal line SL, and the ground line GL described above are put together to the single charging connector 23, and are connected to the charging device-side connector 24 of the charging device 2.

The charging device-side connector 24 and the charging connector 23 are connected when the battery 30 is charged. When they are connected, the feeder line 76, the communication line 77, the signal line SL, and the ground line GL at the charging device 2 side, and the charging electric wire 67C, the communication line 68, the signal line in vehicle SLi, and the ground line GL at the battery-type forklift side are respectively electrically connected in that order. The feeder line 76 at the charging device 2 side and the charging electric wire 67C at the battery-type forklift side are electrically connected, so that the power from the charging device 2 is supplied to the battery 30. Further, the power from the battery 30 is supplied to the charging device power source 71 through the charging electric wire 67C, the feeder line 76, and the power line 76B branched from the feeder line 76. In doing so, the control unit 70 is operated by the power supplied from the battery 30 at the start of charging.

By the communication line 77 at the charging device 2 side and the communication line 68 at the battery-type forklift side are electrically connected, the in-vehicle control device 60 of the battery-type forklift 1 can control the control unit 70 of the charging device 2 through the communication control device 61. In addition, the control unit 70 of the charging device 2 can transmit information to the in-vehicle control device 60 through the communication control device 61 of the battery-type forklift 1. When the signal line SL from the startup signal generation unit 72 of the charging device 2 and the signal line in vehicle SLi of the battery-type forklift 1 are connected, and the ground line GL of the charging device 2 and the ground line GL of the battery-type forklift 1 are connected, a startup signal is input to the startup circuit 63 of the power source device 62 of the battery-type forklift 1. Then, the startup circuit 63 supplies the power to the in-vehicle control device 60 and to the communication control device 61 from the power source device 62 and starts up the devices.

<Structure of Battery 30>

Figure 5:
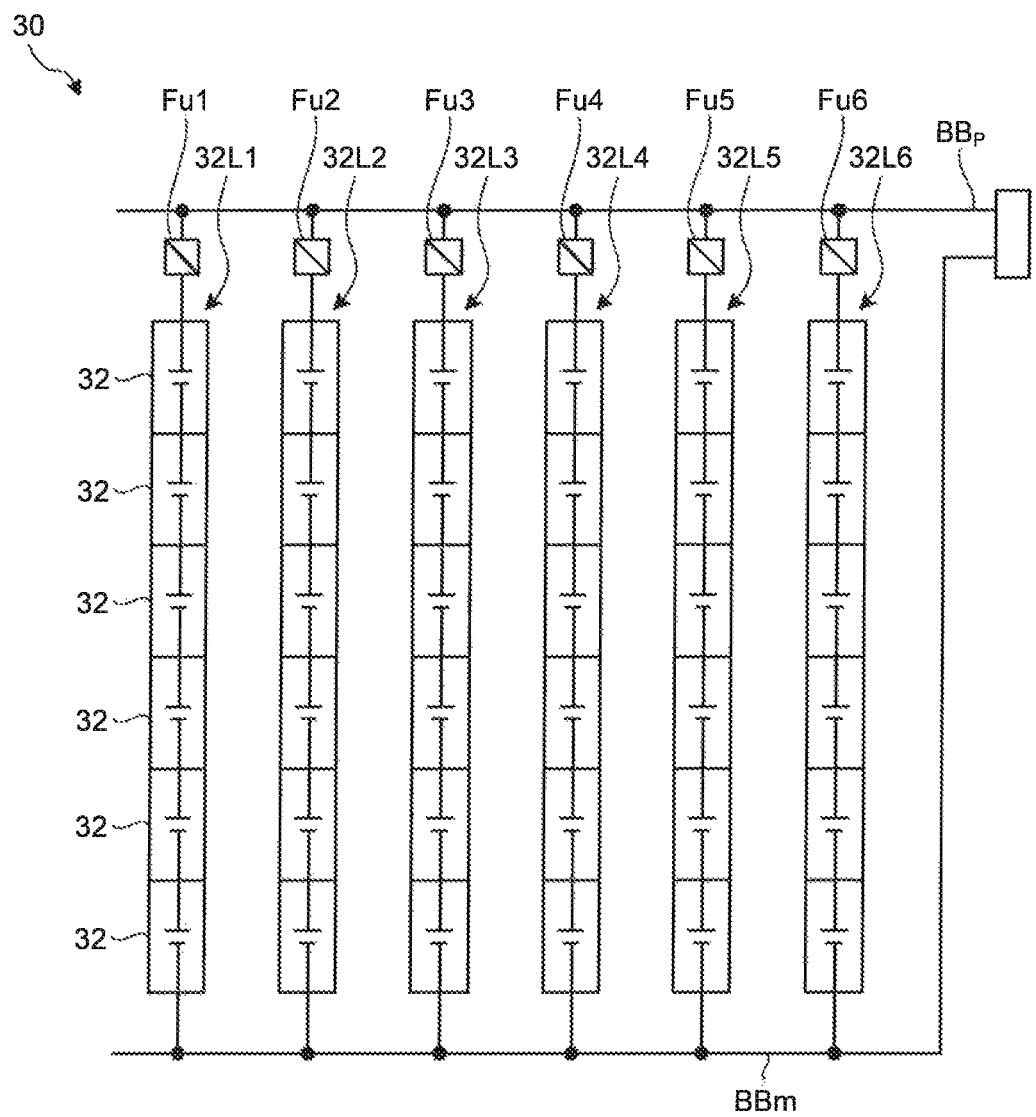
FIG. 5 is an explanatory diagram of a battery included in the battery-type forklift according to the present embodiment.

FIG. 5 is an explanatory diagram of the battery included in the battery-type forklift according to the present embodiment. The battery 30 includes a plurality of battery cells 32. In the present embodiment, the battery cell 32 is a control valve type storage battery (for example, lead storage battery). Such battery cells 32 are suitable for quick charging. Each of the battery cells 32 has 12 V voltage between terminals. In the present embodiment, a plurality of (in this example, six) battery cells 32 is connected in series to form a plurality of (in this example, six) battery cell groups 32L1, 32L2, 32L3, 32L4, 32L5, and 32L6. Each of the battery cell groups 32L1, 32L2, 32L3, 32L4, 32L5, and 32L6 are connected in parallel with copper bus bars BBp and BBm, for example. In this way, the battery 30 is a parallel battery pack in which a plurality of battery cell groups 32L1, 32L2, 32L3, 32L4, 32L5, and 32L6 is connected in parallel.

The bus bar BBm electrically connects negative pole side terminals of the battery cell groups 32L1, 32L2, 32L3, 32L4, 32L5, and 32L6, and the bus bar BBp electrically connects positive pole side terminals of the battery cell groups 32L1, 32L2, 32L3, 32L4, 32L5, and 32L6. Fuses Fu1, Fu2, Fu3, Fu4, Fu5, and Fu6 are connected between the bus bar BBp and the respective battery cell groups 32L1, 32L2, 32L3, 32L4, 32L5, and 32L6.

Since the battery 30 is a parallel battery pack, when variation in temperature occurs among the battery cell groups 32L1, 32L2, 32L3, 32L4, 32L5, and 32L6, an internal resistance of the battery cell 32 having a high temperature is decreased, and the current is more likely to flow. As a result, there is a possibility that variation in charging rate among the battery cell groups 32L1, 32L2, 32L3, 32L4, 32L5, and 32L6 or a decreased in durability of the battery cell 32 may be caused. Typically, by controlling the current flowing in each of the battery cell groups 32L1, 32L2, 32L3, 32L4, 32L5, and 32L6 at the time of charging, the variation in charging rate and the decrease in durability are suppressed.

In the present embodiment, the battery cell groups 32L1, 32L2, 32L3, 32L4, 32L5, and 32L6 have the same total length of the wirings from the bus bar BBp to the bus bar BBm. In doing so, the variation in resistance among the battery cell groups 32L1, 32L2, 32L3, 32L4, 32L5, and 32L6 can be suppressed, and therefore, the variation in temperature occurring in the battery cell groups 32L1, 32L2, 32L3, 32L4, 32L5, and 32L6 can be suppressed. As a result, the in-vehicle control device 60 included in the battery-type forklift 1 can suppress the variation in charging rate without individually controlling the current flowing in the battery cell groups 32L1, 32L2, 32L3, 32L4, 32L5, and 32L6 when the battery 30 is charged.

When charging the battery 30, the in-vehicle control device 60 controls the control unit 70 of the charging device 2 through the communication control device 61, the communication line 68, and the communication line 77. The control unit 70 is operated according to an instruction of the in-vehicle control device 60. The in-vehicle control device 60 controls the control unit 70 of the charging device 2 based on the temperature Tb of the battery 30 detected by the communication control device 61 when charging the battery 30. For example, when the temperature of the battery 30 is increased, the internal resistance of the battery cell 32 is decreased. As a result, more current flows in the battery 30. In the present embodiment, the battery 30 is charged with a constant current. Therefore, the in-vehicle control device 60 changes the instruction value of the charging current battery 30 based on the temperature Tb. For example, the in-vehicle control device 60 decreases the instruction value of the charging current when the temperature Tb of the battery 30 is increased, and increases the instruction value of the charging current when the temperature Tb of the battery 30 is decreased. In this way, by controlling the charging of the battery 30 based on the temperature Tb of the battery 30, the in-vehicle control device 60 does not need to individually control the current flowing in the battery cell groups 32L1, 32L2, 32L3, 32L4, 32L5, and 32L6. Therefore, the in-vehicle control device 60 can simplify the control at the time of charging. When the battery 30 is quickly charged, the temperature of the battery cell 32 is easily increased, and therefore, the control by the in-vehicle control device 60 described above is effective.

<Charging Device Side Connector 24 and Charging Connector 23>

Figure 6:
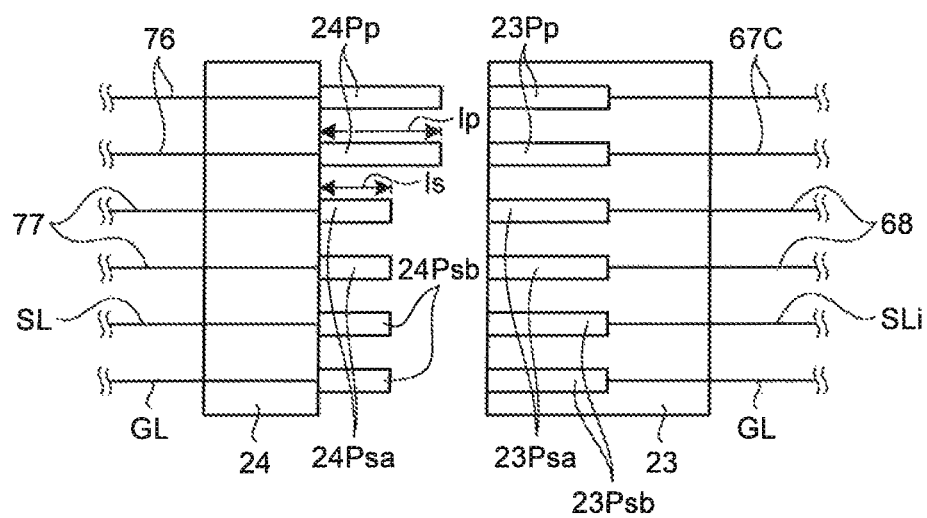
FIG. 6 is a diagram illustrating a charging device-side connector and a charging connector.

FIG. 6 is a diagram illustrating the charging device-side connector and the charging connector. The charging device-side connector 24 includes a supply terminal 24Pp to which the charging device 2 side feeder line 76 is connected, a communication terminal 24Psa to which the charging device 2 side communication line 77 is connected, and a startup terminal 24Psb to which the signal line SL and the ground line GL are connected. The supply terminal 24Pp is a terminal for supplying the direct-current power output from the power conversion unit 73 to the battery 30. The communication terminal 24Psa is a terminal for communicating with the battery-type forklift 1, to be specific, with the in-vehicle control device 60. The startup terminal 24Psb is a terminal for transmitting a startup signal for starting up the in-vehicle control device 60 to the startup circuit 63 of the power source device 62.

The charging connector 23 includes a charging terminal 23Pp to which the battery-type forklift 1 side charging electric wire 67C is connected, a communication terminal 23Psa to which the battery-type forklift 1 side communication line 68 is connected, and a signal terminal 23Psb to which battery-type forklift 1 side signal line in vehicle SLi and ground line GL are connected. The charging terminal 23Pp is a terminal to which the supply terminal 24Pp included in the charging device 2 is connected when the battery 30 is charged. The communication terminal 23Psa is a terminal to which the communication terminal 24Psa used for communication between the charging device 2 and the battery-type forklift 1 is connected when the battery 30 is charged. The signal terminal 23Psb is a terminal for transmitting a signal (to be specific, a startup signal) from the charging device 2 when the battery 30 is charged, that is, a terminal to which the startup terminal 24Psb of the charging device 2 is connected. The charging terminal 23Pp, the communication terminal 23Psa, and the signal terminal 23Psb are arranged in the same connector, that is, in the charging connector 23. In doing so, it is not necessary to use a plurality of connectors, and therefore, work at the time of charging can be simplified.

The supply terminal 24Pp of the charging device-side connector 24 is connected to the charging terminal 23Pp of the charging connector 23, the communication terminal 24Psa of the charging device-side connector 24 is connected to the communication terminal 23Psa of the charging connector 23, and the startup terminal 24Psb of the charging device-side connector 24 is connected to the signal terminal 23Psb of the charging connector 23. The length lp of the supply terminal 24Pp included in the charging device-side connector 24 is longer than the length ls of the communication terminal 24Psa and of the startup terminal 24Psb. In doing so, when the charging device-side connector 24 and the charging connector 23 are connected, the supply terminal 24Pp and the charging terminal 23Pp are first connected, and the communication terminal 23Psa, the communication terminal 24Psa, the signal terminal 23Psb, and the startup terminal 24Psb are then connected. The supply terminal 24Pp, the communication terminal 24Psa, and the startup terminal 24Psb are arranged in the same connector, that is, in the charging device-side connector 24. In doing so, it is not necessary to use a plurality of connectors. Therefore, the work at the time of charging can be simplified.

The control unit 70 of the charging device 2 is operated only when the communication terminal 23Psa and the communication terminal 24Psa are connected, and the communication between the control unit 70 and the in-vehicle control device 60 of the battery-type forklift 1 is established. Therefore, the control unit 70 is not operated before the communication terminal 23Psa and the communication terminal 24Psa are connected, the charging device 2 does not output the power from the feeder line 76. If fitting between the charging device-side connector 24 and the charging connector 23 is imperfect, and connection between the communication terminal 23Psa and the communication terminal 24Psa are insufficient, the charging device 2 does not output the power from the feeder line 76, and therefore, the safety is sufficiently secured. In addition, during charging, even if the fitting between the charging device-side connector 24 and the charging connector 23 is imperfect, the connection between the communication terminal 23Psa and the communication terminal 24Psa becomes insufficient, the charging device 2 does not output the power from the feeder line 76, and therefore, the safety at the time of charging is sufficiently secured. Based on this perspective, when a gap is caused between the charging device-side connector 24 and the charging connector 23, the length is of the communication terminal 24Psa is favorably set to length with which the connection between the communication terminal 23Psa and the communication terminal 24Psa is canceled. In doing so, the sufficient safety can be further secured at the time of charging.

In the present embodiment, the in-vehicle control device 60 mounted on the battery-type forklift 1 controls the control unit 70 of the charging device 2 disposed outside the battery-type forklift 1 through the communication control device 61, the communication line 68, and the communication line 77. That is, in the present embodiment, the charging device 2 capable of quick charge is a stationary-type device, and the control device that executes charging control is an on-board device. In doing so, when connection between the communication terminal 23Psa and the communication terminal 24Psa that connect the communication line 68 and the communication line 77 inside and outside the battery-type forklift 1 is canceled, the control unit 70 of the charging device 2 stops the operation. As a result, output of the power from the feeder line 76 is stopped, and therefore, the charging device 2 can secure sufficient safety.

<Operation of in-Vehicle Control Device, Charging Device and the Like at the Time of Charging>

Figure 7:
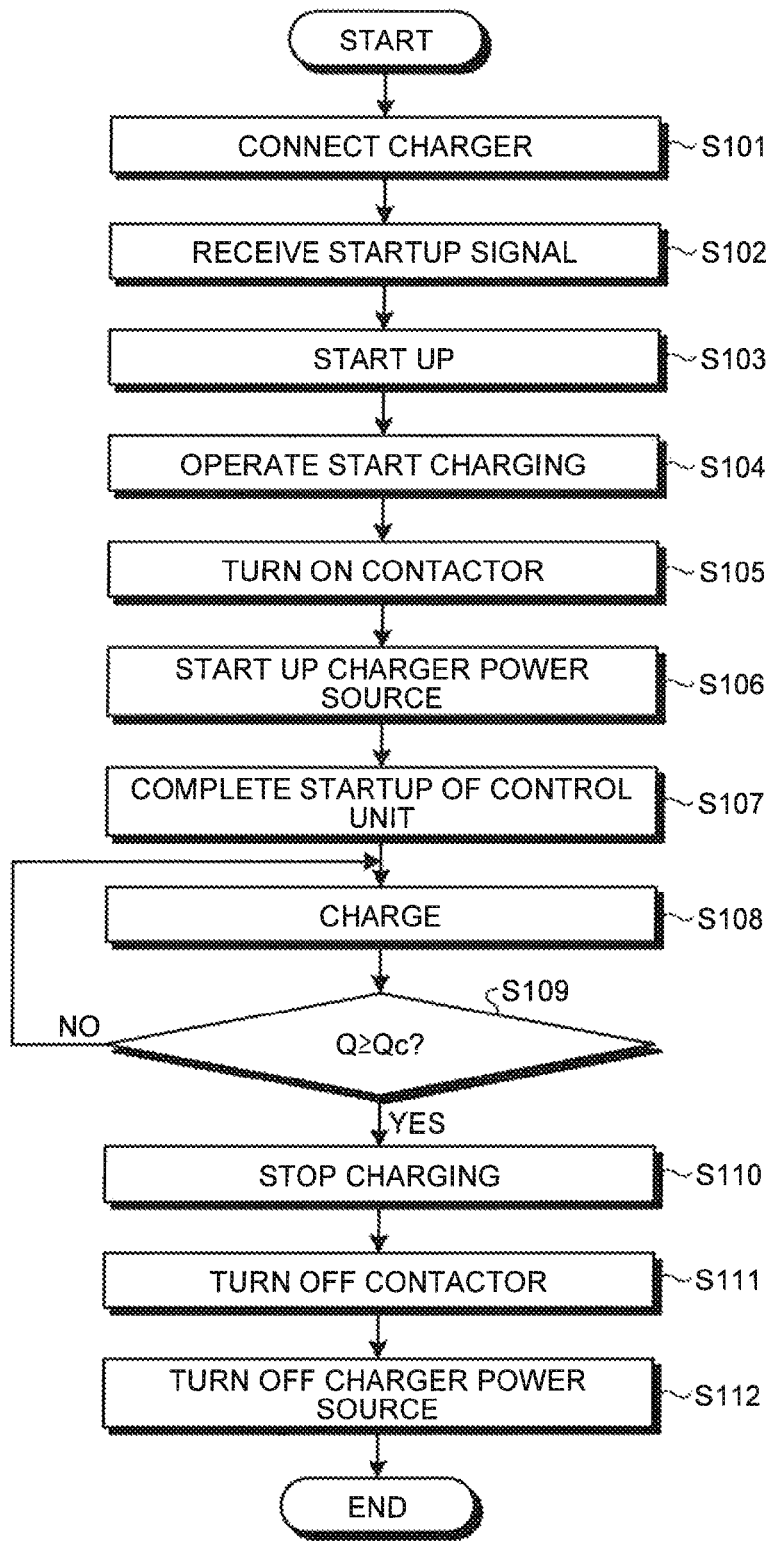
FIG. 7 is a flowchart illustrating an example of an operation of an in-vehicle control device, a charging device, and the like when the battery is charged.

FIG. 7 is a flowchart illustrating an example of operations of the in-vehicle control device, the charging device, and the like when the battery is charged. When charging the battery 30 mounted on the battery-type forklift 1, in step S101, an operator and the like of the battery-type forklift 1 connects the charging device-side connector 24 of the charging device 2 to the charging connector 23 of the battery-type forklift 1. Then, the startup terminal 24Psb of the charging device-side connector 24 and the signal terminal 23Psb of the charging connector 23 are connected, a startup signal is transmitted from the startup signal generation unit 72 to the startup circuit 63 of the power source device 62. In step S102, when the startup circuit 63 receives the startup signal, the power source device 62 supplies the power to the in-vehicle control device 60 and the communication control device 61. In step S103, the in-vehicle control device 60 and the communication control device 61 are started up.

The operation proceeds to step S104, the operator and the like execute an operation of start charging using the display panel 52, for example. Then, in step S105, the in-vehicle control device 60 turns ON the contactor 66 provided in the charging electric wire 67C, that is, causes the contactor 66 to be in a conductive state. At this time, the contactor 69 is turned OFF, that is, in a non-conductive state. Then, the battery 30 connects with the power conversion unit 73 of the charging device 2 through the power line 67, the charging electric wire 67C, the charging terminal 23Pp of the charging connector 23, the supply terminal 24Pp of the charging device-side connector 24, and the feeder line 76. In step S106, the charging device power source 71 of the charging device 2 is started up, and starts supplying of the power to the control unit 70. In step S107, the control unit 70 is started upon receiving the supplying of the power from the charging device power source 71. When the started up is completed, the control unit 70 transmits a signal of the completion of the startup to the in-vehicle control device 60 through the communication control device 61.

In step S108, the in-vehicle control device 60 starts charging upon receiving the signal of the completion of the startup from the control unit 70 of the charging device 2. To be specific, the in-vehicle control device 60 transmits an instruction value of the charging current to the control unit 70 of the charging device 2. The control unit 70 drives the power conversion unit 73, to be specific, the switching element 73SW based on the instruction value of the charging current transmitted from the in-vehicle control device 60. As a result, the power conversion unit 73 supplies the direct-current power of the current corresponding to the instruction value of the charging current to the battery 30. In step S109, a storage capacity Q of the battery 30 and a predetermined storage capacity Qc are compared. When Q<Qc (No in step S109), the in-vehicle control device 60 continues the charging to the battery 30 by the charging device 2.

When Q≥Qc (Yes in step S109), in step S110, the in-vehicle control device 60 stops the charging of the battery 30 by the charging device 2. For example, the in-vehicle control device 60 stops the charging to the battery 30 by transmitting an instruction value with which the charging current becomes 0 to the control unit 70 of the charging device 2. The control unit 70 of the charging device 2 transmits a signal (stop signal) indicating stopping the charging device 2 to the in-vehicle control device 60. The in-vehicle control device 60 that has received the stop signal, in step S111, the contactor 66 is turned OFF, that is, caused to be in a non-conductive state. At this time, the contactor 69 is turned OFF, that is, in the non-conductive state. As a result, in step S112, the supply of the power to the charging device power source 72 from the battery 30 is stopped, and therefore, the charging device power source 71 is turned OFF. With such as a procedure, the charging of the battery 30 is completed.

<Battery Case 31 of Battery 30>

Figure 8:
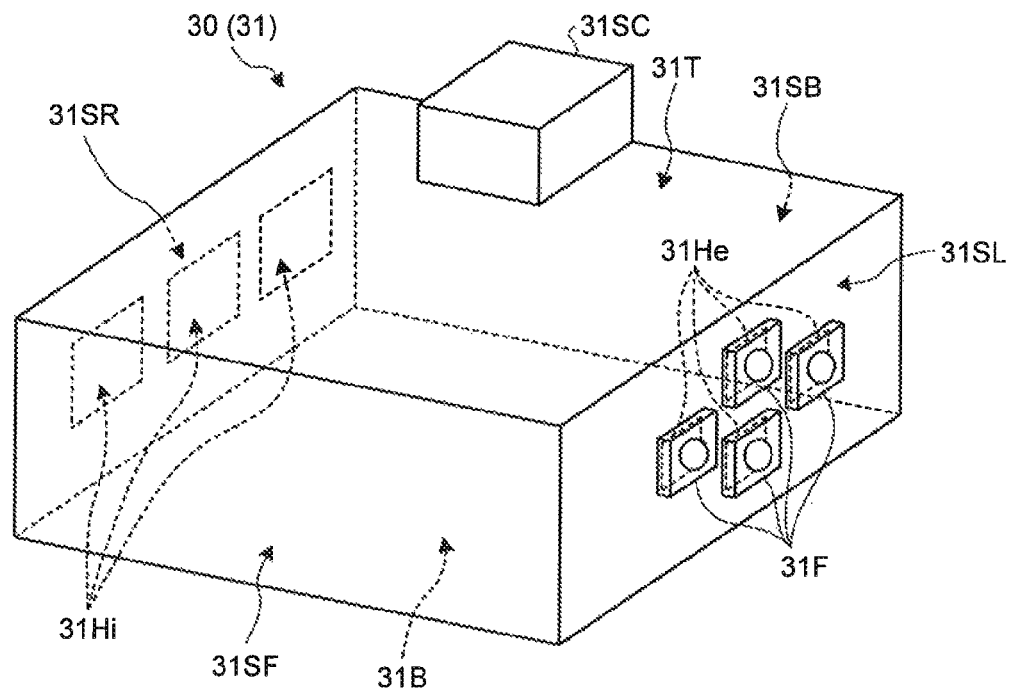
FIG. 8 is a perspective view illustrating a battery and a battery case according to the present embodiment.
Figure 9:
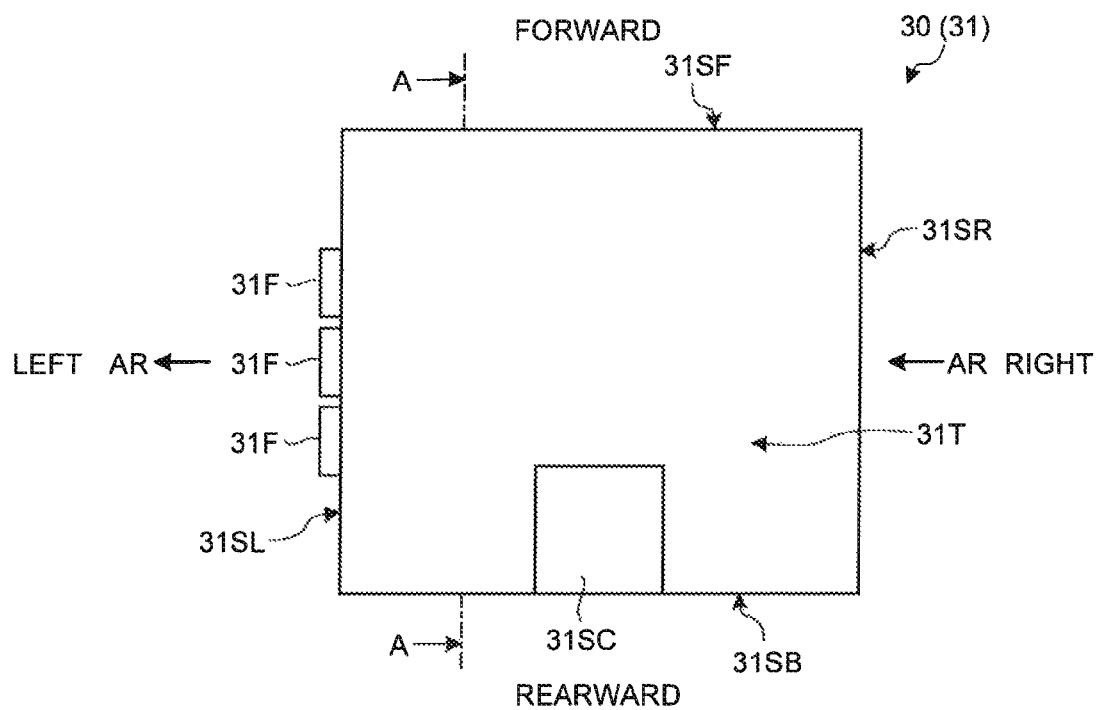
FIG. 9 is a plane view illustrating the battery and the battery case according to the present embodiment.
Figure 10:
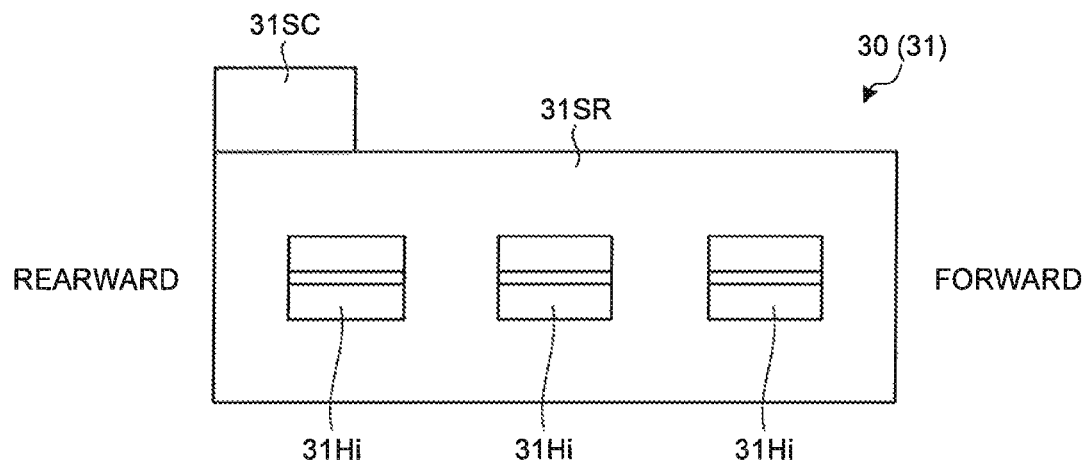
FIG. 10 is a right-side view illustrating the battery and the battery case according to the present embodiment.
Figure 11:
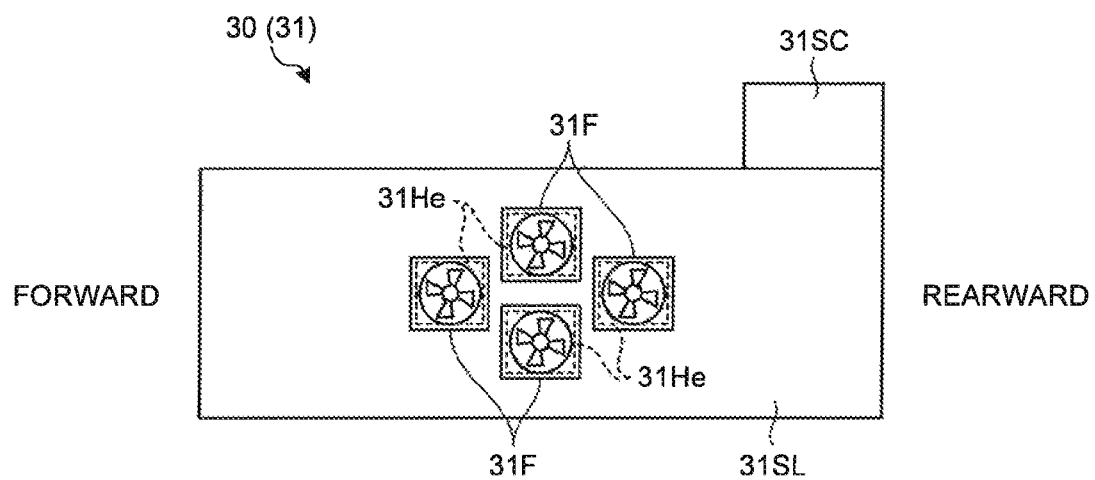
FIG. 11 is a left-side view illustrating the battery and the battery case according to the present embodiment.

FIG. 8 is a perspective view illustrating a battery and a battery case according to the present embodiment. FIG. 9 is a perspective view illustrating a battery and a battery case according to the present embodiment. FIG. 10 is a right-side view illustrating a battery and a battery case according to the present embodiment. FIG. 11 is a left-side view illustrating a battery and a battery case according to the present embodiment. The battery 30 stores the above-described plurality of battery cells 32 in the battery case 31. The battery case 31 includes a bottom part 31B, an upper part 31T that faces the bottom part 31B, and side parts 31SF, 31SB, 31SL, and 31SR that connect the bottom part 31B and the upper part 31T. The battery case 31 stores the plurality of battery cells 32 such that at least parts of at least one side surfaces of the plurality of battery cells 32 are in contact with one another in a space surrounded by the upper part 31T, the bottom part 31B, and the side parts 31SF, 31SB, 31SL, and 31SR.

A storage case 31SC that stores a safety circuit is attached to the upper part 31T of the battery case 31. The fuses Fu1, Fu2, Fu3, Fu4, Fu5, and Fu6 and the contactor 66 described above are stored in the storage case 31SC. The battery case 31 has a rectangular parallelepiped structure as illustrated in FIG. 8. The upper part 31T, the bottom part 31B, and the side parts 31SF, 31SB, 31SL, and 31SR are rectangular (including square) plate members.

FIG. 9 illustrates a state in which the battery 30 is mounted on the battery-type forklift 1. As illustrated in FIG. 9, in the battery 30, the side part 31SF of the battery case 31 faces forward, and the side part 31SB of the battery case 31 faces backward. Further, in the battery 30, the side part 31SL of the battery case 31 faces the left side, and the side part 31SR of the battery case 31 faces the right side. Forward and backward corresponds forward and backward of the battery-type forklift 1 illustrated in FIGS. 2 and 3. That is, when the battery 30 is mounted on the battery-type forklift 1, the side part 31SF faces forward and the side part 31SB faces backward.

As illustrated in FIGS. 8 and 10, among the four side parts 31SF, 31SB, 31SL, and 31SR, the right-side side part 31SR includes a suction port 31Hi opening thereto. The suction port 31Hi introduces a gas into the battery case 31. The gas is air in the present embodiment. In the present embodiment, the side part 31SR has a plurality of (in the example, three) suction ports 31Hi. However, the number of the suction ports 31Hi is not limited to three. As illustrated in FIGS. 8 and 11, among the four side parts 31SF, 31SB, 31SL, and 31SR, a side part facing the side part 31SR in which the suction port 31Hi is open, that is, the left-side side part 31SL includes an exhaust port 31He opening thereto. The exhaust port 31He discharges the gas introduced in the battery case 31. In the present embodiment, the side part 31SL includes a plurality of (in the example, four) exhaust ports 31He. However, the number of exhaust ports 31He is not limited to four.

The battery case 31 includes a fan 31F. The fan 31F introduces the gas into the battery case 31 through the suction port 31Hi, allows the gas to flow while contacting with upper surfaces and lower surfaces of the plurality of battery cells 32, and discharges the gas from the battery case 31. In the present embodiment, the battery case 31 includes a plurality of (in the example, four) fans 31F. The number of fans 31F is not limited to four. Each of the fans 31F is attached to the exhaust port 31He. With such a structure, the plurality of fans 31F sucks and discharges the gas from the battery case 31 to an outside. The fan 31F sucks the gas from the battery case 31, and therefore, the flow of the gas through the suction port 31Hi into the exhaust port 31He in the battery case 31 can be stably made.

When the plurality of fans 31F discharges the gas from the battery case 31, the pressure in the battery case 31 becomes lower than the outside. Therefore, the gas is introduced through the suction port 31Hi into the interior of the battery case 31. In the present embodiment, the gas is introduced from the right side of the battery case 31 to the interior and discharged from the left side, as illustrated by the arrows AR in FIG. 9. In doing so, the plurality of battery cells 32 stored in the battery case 31 is cooled.

In relation to the vehicle body 10 of the battery-type forklift 1 illustrated in FIG. 2, the suction port 31Hi is arranged in one part of the battery-type forklift 1 in a width direction, and the exhaust port 31He is arranged in the other part in the width direction. In the present embodiment, the suction port 31Hi is arranged on the right side of the vehicle body 10, and the exhaust port 31He is arranged on the left side of the vehicle body 10. The gas is introduced into the battery case 31 from the right side of the vehicle body 10 and is discharged from the left side. The fan 31F is attached to the exhaust port 31He, and therefore the fan 31F is arranged on the left side of the vehicle body 10. Therefore, the increase in size of the vehicle body 10 in the front and rear direction due to the attachment of the battery case 31 to the fan 31F can be suppressed.

Figure 12:
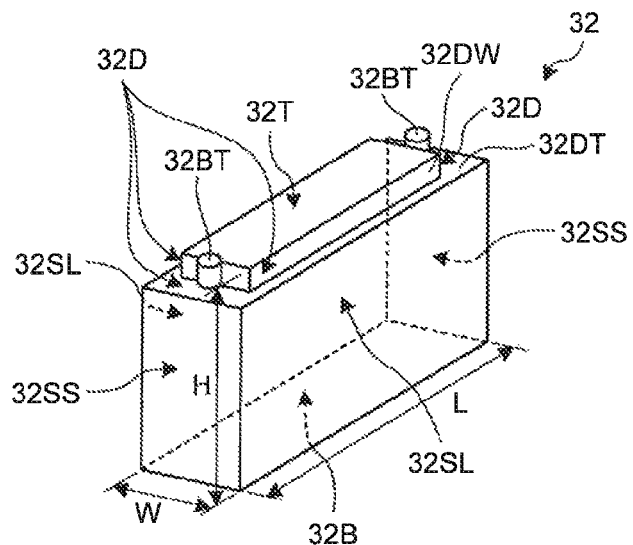
FIG. 12 is a perspective view illustrating an example of battery cells provided in the battery according to the embodiment.

FIG. 12 is a perspective view illustrating an example of the battery cell included in the battery according to the present embodiment. The battery cell 32 has a rectangular parallelepiped structure. The battery cell 32 include an upper surface 32T having a rectangular plane view, in which a terminal 32BT is provided, a lower surface 32B having a rectangular plane view, which faces the upper surface 32T, and four side surfaces 32SL, 32SL, 32SS, and 32SS having rectangular plane view, which connects the upper surface 32T and the lower surface 32B. In the battery cell 32, the distance H between the upper surface 32T and the lower surface 32B is larger than the size W of the shorter side of the upper surface 32T.

In the lower surface 32B, the plane view is rectangular, and the size W of adjacent one side is smaller than the size L of other sides. The size W is the width of the battery cell 32, and the size L is the length of the battery cell 32. Further, the distance (the minimum distance) H between the upper surface 32T and the lower surface 32B is the height of the battery cell. That is, in the battery cell 32, the height H is larger than the width W. In the present embodiment, the length L of the battery cell 32 is larger than the height H. That is, the battery cell 32 has a rectangular parallelepiped structure, in which the length L is the longest, the width W is the shortest, the height H is between the length L and the width W. Respective areas of the facing side surfaces 32SL and 32SL are larger than respective areas of the facing side surfaces 32SS and 32SS. Hereinafter, the side surfaces 32SL and 32SL are appropriately referred to as large side surfaces 32SL and 32SL, and the side surfaces 32SS and 32SS are appropriately referred to as small side surfaces 32SS and 32SS.

The battery cell 32 includes a step part 32D between the upper surface 32T, and the side surfaces 32SL, 323L, 32SS, and 32SS adjacent to the upper surface 32T. The step part 32D includes a step part upper surface 32DT parallel with the upper surface 32T and the lower surface 32B, and a step part side surface 32DW rising from the step part upper surface 32DT. In the present embodiment, the step part side surface 32DW is approximately perpendicular to the step part upper surface 32DT.

The plurality of battery cells 32 is stored in the battery case 31. Then, a third wiring 43, a first wiring 41, and a second wiring 43 are connected to the terminal 32B of each battery cell 32. In the battery case 31, the first wiring 41, a second wiring 42, and the third wiring 43 are stored in the step part 32D of the battery cell 32.

Figure 13:
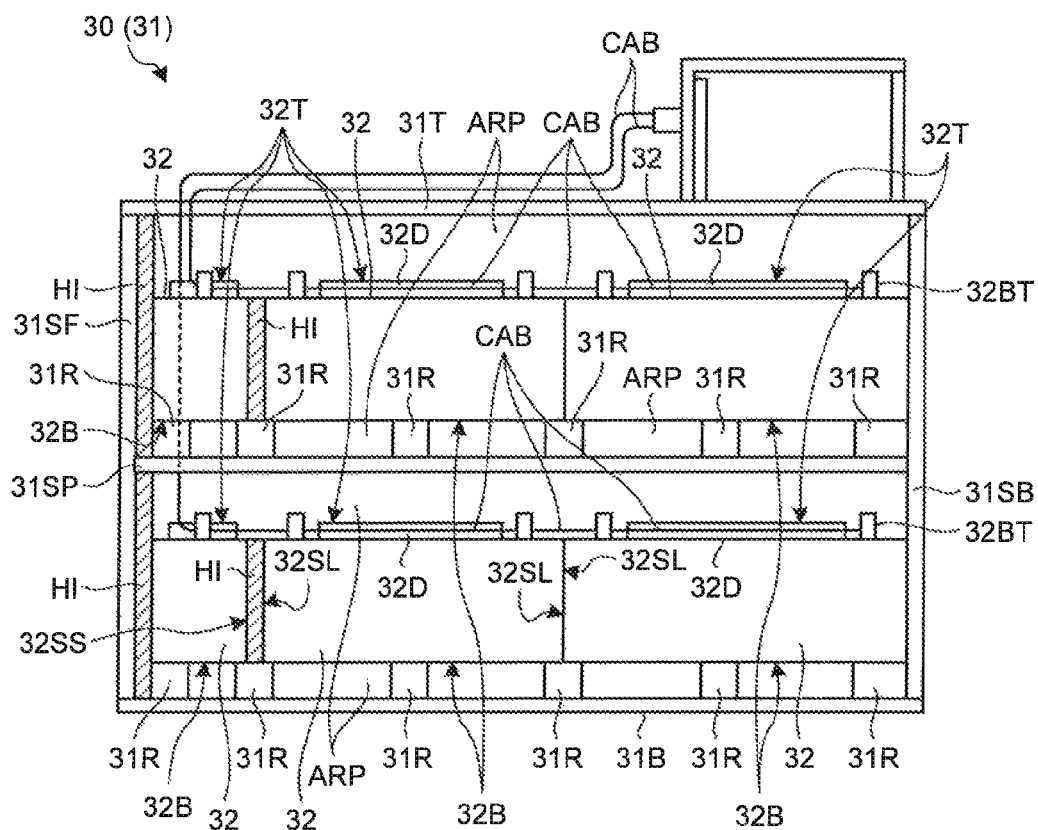
FIG. 13 is a view on arrow A-A of FIG. 9.
Figure 14:
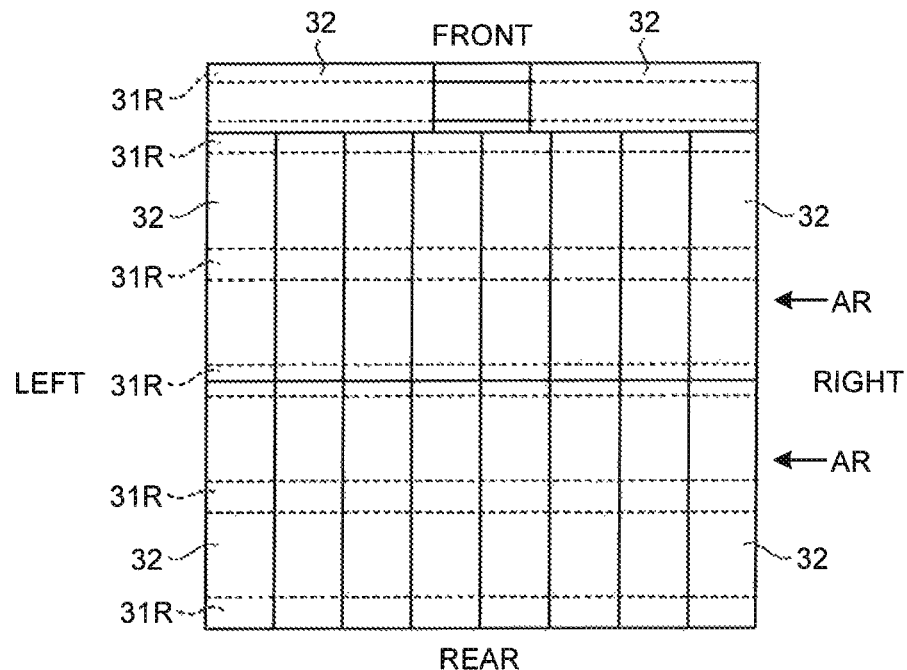
FIG. 14 is a diagram illustrating a relationship between the battery case and bars.
Figure 15:
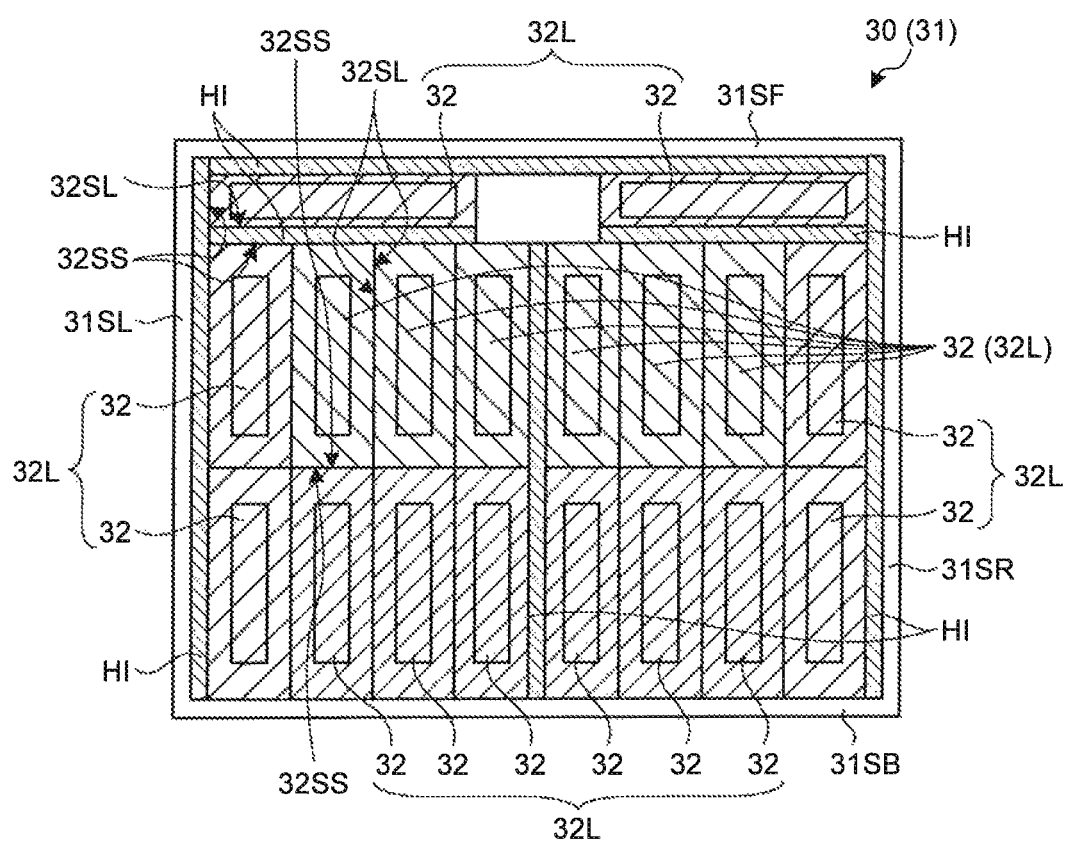
FIG. 15 is a plane view illustrating a state where an upper part of the battery case is removed.

FIG. 13 is a view on arrow A-A of FIG. 9. FIG. 14 is a diagram illustrating a relationship between the battery case and bars. The arrows AR in FIG. 14 indicate the flow of the gas. FIG. 15 is a plane view illustrating a state where an upper part of the battery case is removed. As illustrated in FIG. 13, in the present embodiment, the battery case 31 includes a partition member 31SP between the upper part 31T and the lower part 31B, which partitions the interior of the battery case 31. The plurality of battery cells 32 is arranged between the upper part 3LT and the partition member 31SP and between the partition member 31SP and the lower part 31B. The partition member 31SP is a plate member. The partition member 31SP has a rectangular plane view (including a square). The partition member 31SP is arranged inside the side parts 31SF, 31SB, 31SL, and 31SR of the battery case 31.

The battery 30 includes a plurality of bars 31R as a plurality of rod-like members extending from the suction port 31Hi to the exhaust port 31He illustrated in FIGS. 8 and 10. The plurality of bars 31R is disposed on a surface of the partition member 31SP and at the upper part 31T side of the battery case 31. Similarly, the plurality of bars 31R is disposed on a surface of the bottom part 31B of the battery case 31, and at the upper part 31T of the battery case 31. In the present embodiment, the plurality of bars 31R is disposed such that the direction into which the bars 31R themselves extend (longitudinal direction) and the right and left direction (width direction) of the battery case 31 are parallel with each other.

As illustrated in FIG. 13, each bar 31R is in contact with the lower surface 32B of the battery cell 32 and supports the battery cell 32. Since the plurality of bars 31R is disposed between the lower surface 32B of the battery cell 32 and the partition member 31SP, and between the lower surface 32B of the battery cell 32 and the bottom part 31B, gas passages ARP, through which the gas passes, are respectively formed between the lower surface 32B of the battery cell 32 and the partition member 31SP, and between the lower surface 32B of the battery cell 32 and the bottom part 31B. In addition, gas passages ARP, through which the gas passes, are respectively formed between the upper part 31T of the battery case 31 and the upper part 31T of the plurality of battery cells 32, and between the partition member 31SP and the upper part 31T of the plurality of battery cells 32.

With such a structure, the gas introduced into the battery case 31 through the suction port 31Hi illustrated in FIGS. 8 and 10 flows while being in contact with the upper surface 32T and the lower surface 32B of the plurality of battery cells 32 arranged between the upper part 31T and the partition member 31SP, and the upper surface 32T and the lower surface 32B of the plurality of battery cells 32 arranged between the partition member 31SP and the lower part 31B, in the process of passing through the gas passages ARP. In this way, the battery cells 32 are cooled. Especially, when the battery 30 is quickly charged, each battery cell 32 generates heat. Therefore, by flowing the gas in the gas passages ARP, the heat generated by the plurality of battery cell 32 is released from the battery case 31 to an outside.

In the present embodiment, the battery case 31 includes four gas passages ARP. It is favorable for these gas passages ARP that the areas of the cross sections perpendicular to the direction into which the gas flows become equal. In doing so, the amount of the gas that flows in all of the gas passages ARP becomes equal, and therefore, the variation in cooling among the battery cells 32 can be suppressed.

As illustrated in FIGS. 13 and 14, there are the bar 31R that is in contact with the lower surfaces 32B of two battery cells 32, and the bar 31R that is in contact with the lower surface 32B of one battery cell 32. Each bar 31R extends from the suction port 31Hi to the exhaust port 31He.

Therefore, the plurality of bars 31R partitions the gas passage ARP between the plurality of battery cells 32 and the partition member 31SP, and the gas passage ARP between the plurality of battery cells 32 and the bottom part 31B into a plurality of passages. With such a structure, the gas introduced through the suction port 31Hi into the battery case 31 is divided by the plurality of bars 31R and flows in each passage. Therefore, uniformity of distribution of the gas can be realized in a direction perpendicular to the extending direction of the bar 31R. As a result, the variation in temperature among the plurality of battery cells 32 can be suppressed.

As illustrated in FIG. 13, a power cable CAB connected to a positive electrode and a negative electrode of each battery cell 32 is arranged along the upper surface 32T of each battery cell 32. In doing so, floating of the power cable CAB from the upper surface 32T of the battery cell 32 can be suppressed, and therefore, projection of the power cable CAB into the gas passage ARP in the battery case 31 can be suppressed. Therefore, a decrease in passage cross section of the gas passage ARP is suppressed, and a decrease in flow rate of the gas passing through the gas passage ARP is suppressed. As a result, the battery 30 can suppress a decrease in cooling efficiency of the plurality of battery cells 32 included in the battery 30 itself, and can further suppress the variation temperature among the plurality of battery cells 32.

As described above, the power cable CAB is stored in the step part 32D of the battery cell 32 in the battery case 31. Therefore, in the battery case 31, projection of the first wiring 41, the second wiring 42, and the third wiring 43, that is, projection of the power cable CAB into the gas passage ARP in the battery case 31 can be suppressed. As a result, in the battery 30, the decrease in flow rate of the gas that passes through the gas passage ARP can be suppressed, and therefore, the decrease in cooling efficiency of the plurality of battery cells 32 included in the battery 30 itself and the variation in temperature can be suppressed.

In the present embodiment, for example, as illustrated in FIG. 14, eight battery cells 32 form a line of the battery cells 32 (hereinafter, referred to as sell line) in a state where at least parts of the large side surfaces 32SL of the eight battery cells 32 are in contact with one another. Two sell lines are arranged in the battery case 31. At least parts of the small side surfaces 32SS of the battery cells 32 of the sell lines are in contact with one another. Further, two battery cells 32 are arranged adjacent to one sell line in the battery case 31. In the battery cells 32, at least a part of each large side surface 32SL and at least parts of the small side surfaces 32SS of the plurality of battery cells 32 included in one sell line are close to each other.

In the battery cells 32 arranged at both ends of the sell line, only one of the large side surfaces 32SL is in contact with the large side surface 32SL of an adjacent battery cell 32, and the other large side surface 32SL is in contact with either the side part 31SL or the side part 31SR of the battery case 31. In two battery cells 32 having the large side surfaces 32SL in contact with one sell line, the large side surface 32SL that is not in contact with the small side surface 32SS faces the side part 31SF of the battery case 31, and one small side surface 32SS faces either the side part 31SL or the side part 31SR of the battery case 31. Further, in two battery cells 32, the small side surfaces 32SS that do not face the side part 31SL or the side part 31SR face each other.

FIG. 15 illustrates arrangement of the plurality of battery cells 32 disposed on the upper part of the partition member 31SP described above. The plurality of battery cells 32 is arranged on the upper part of the bottom part 31B of the battery case 31, similarly to the upper part of the partition member 31SP. In the present embodiment. On the upper part of the partition member 31SP, a total of eighteen battery cells 32 are arranged. Therefore, a total of thirty six battery cells 32 are arranged in the battery case 31. As described above, the battery 30 has six battery cells 32 connected in series as one battery cell group 32L, and a plurality of (six in the present embodiment) battery cell groups 32L are connected in parallel. In the present embodiment, six battery cells 32 except for the two battery cells 32 arranged at the both ends of one sell line form one battery cell group 32L. Further, a total of six battery cells 32: a total of four battery cells 32 arranged at the both ends of the respective sell lines and the two battery cells 32 having the large side surfaces 32SL in contact with one sell line form one battery cell group 32L.

In the present embodiment, as illustrated in FIGS. 13 and 15, a heat insulating material HI is provided between the plurality of battery cells 32 and an inner side of the side part 31SF of the battery case 31. The heat insulating material HI is in contact with both of the battery cell 32 and the inner side of the side part 31SF of the battery case 31. In addition, the heat insulating material HI is provided between parts of the battery cells 32. The heat insulating material HI suppresses heat radiation of the battery cells 32 to the outside of the battery case 31. In doing so, the variation in temperature among the battery cells 32 can be suppressed. Therefore, especially, at the time of charging, the variation in temperature among the battery cells 32 can be suppressed, and therefore, it is effective to suppress the variation in charging rate and the decrease in durability of the battery cells 32. In addition, the heat insulating material HI can suppress the movement of the battery cells 32 in the battery case 31. In addition, when the battery-type forklift 1 suddenly starts or suddenly stops, the impact given to the battery cells 32 can be reduced.

The fan 31F is controlled by the in-vehicle control device 60 illustrated in FIG. 4. In the present embodiment, at least during charging of the plurality of battery cells 32 included in the battery 30, the in-vehicle control device 60 sucks the gas from the interior of the battery case 31 to cool the plurality of battery cells 32. In doing so, the variation in temperature among the battery cells 32 at the time of charging can be suppressed. Therefore, it is effective to suppress the variation in charging rate and the decrease in durability of the battery cells 32. In the present embodiment, during discharging of the plurality of battery cells 32 included in the battery 30, the in-vehicle control device 60 can suck the gas from the interior of the battery case 31 and suppress the increase in temperature of the battery cells 32.

Figure 16:
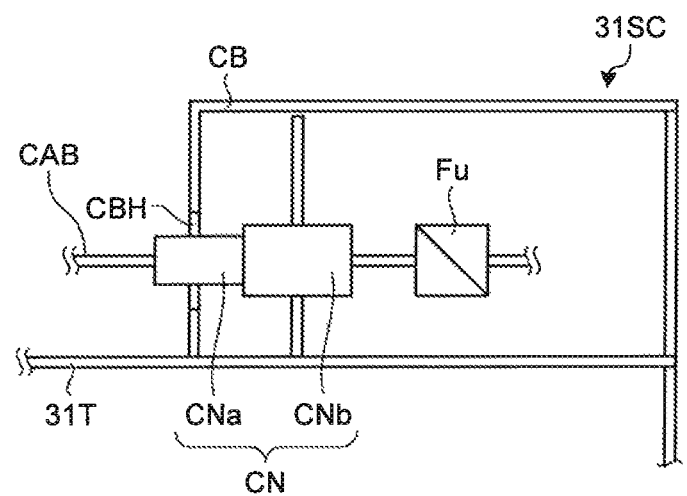
FIG. 16 is a diagram illustrating a structure of a storage case.

FIG. 16 is a diagram illustrating a structure of a storage case. A fuse Fu is stored in the storage case 31SC. The fuse Fu corresponds to the fuses Fu1, Fu2, Fu3, Fu4, Fu5, and Fu6 illustrated in FIG. 5. The fuse Fu is electrically connected to the terminal 32BT of the battery cell 32 through the power cable CAB. The power cable CAB drawn from the plurality of battery cell groups 32L and the fuse Fu are connected with a connector CN. The connector CN includes a first connector CNa and a second connector CNb. The power cable CAB is connected to the first connector CNa, and the fuse Fu is connected to the second connector CNb. The second connector CNb is attached to the storage case 31SC.

A cover CB is attached to the storage case 31SC. The cover CB includes an opening CBH for allowing the first connector CNa to pass through. The first connector CNa is inserted into the second connector CNb through the opening CBH. When the cover CB is removed and the interior of the storage case 31SC is inspected, it is necessary to remove the cover CB. When the cover CB is about to be removed in a state where the first connector CNa is being connected to the second connector CNb, the first connector CNa engages with the opening CBH of the cover CB. Therefore, the cover CB cannot be removed unless the first connector CNa is removed from the second connector CNb. When the first connector CNa is removed from the second connector CNb, the cover CB can be removed. When the first connector CNa is removed from the second connector CNb, the power from the battery cell 32 is not applied to the fuse Fu. Therefore, it is safe if touching the parts and the like in the storage case 31SC.

In the present embodiment, the first connector CNa to which the power cable CAB of the battery cell 32 is connected is provided in the opening CBH provided in the cover CB of the storage case 31SC. With such a structure, the cover CB cannot be removed unless the first connector CNa is removed from the second connector CNb, the safety is improved.

As illustrated in FIG. 9, the storage case 31SC is provided posterior to the battery case 31. In relation to the vehicle body 10 of the battery-type forklift 1 illustrated in FIG. 2, the storage case 31SC is provided at a rear side of the vehicle body 10. The battery 30 is disposed at below the driver's seat 34 of the battery-type forklift 1 as illustrated in FIG. 2. When the cover CB of the storage case 31SC is removed for exchanging of the fuse Fu and the like, as illustrated in FIG. 2, the driver's seat 34 is rotated around the axis of a support axis 33a and a part above the battery 30 is released. At this time, the storage case 31SC is provided at a rear side of the vehicle body 10, and therefore, the storage case 31SC can be more easily accessed by the work vehicle. Therefore, the exchange of the fuse Fu or the inspection of the storage case 31SC becomes more easier.

The battery case 31 can suppress the variation in temperature of each battery cell 32 when the battery 30 is charged, with the heat insulating material HI and the fan 31F. Therefore, it is effective to suppress the variation in charging rate and to suppress the decrease in durability of the battery cell 32. Therefore, the in-vehicle control device 60 illustrated in FIG. 4 does not need to execute parallel control when the battery 30 is charged. Therefore, control at the time of charging can be simplified. The parallel control is control to adjust the charge amount so that the charge amount of each battery cell is leveled when a battery pack in which a plurality of battery cells is connected in parallel. When the battery cell 32 is cooled by the fan 31F, it is favorable to provide a gap between the adjacent battery cells 32. However, if a gap is provided, the size of the battery case 31 is increased. Since the battery-type forklift 1 is required to turn in a small radius, the vehicle body 10 is favorably compact to a maximum extent. Further, since the battery-type forklift 1 stores the battery 30 below the driver's seat 34, if a gap is provided between the battery cells 32, the necessary number of battery cells 32 may not be able to be stored.

Therefore, in the present embodiment, the battery cells 32 that form the sell line are stored in the battery case 31 in a state where at least parts of at least one of the four side surfaces 32SL, 32SL, 32SS, and 32SS are in contact with each other. In doing so, it is not necessary to provide a gap between the battery cells 32, and therefore, the increase in size of the battery case 31 can be suppressed. Then, the gas flows while being in contact with the upper surface 32T and the lower surface 32B of each battery cell 32, so that each battery cell 32 is cooled. In this way, the battery 30 can realize both of the suppression of the increase in size and the securing of the cooling of the battery cell 32.

In the present embodiment, the battery case 31 may not include the partition member 31SP. That is, only one step may be arranged between the upper part 31T and the bottom part 31B, instead of one step of the plurality of battery cells 32 being arranged at both of the upper part 31T side and the bottom part 31B side. Further, a plurality of fan 31F may send the gas into the battery case 31 instead of sucking the gas from the battery case 31.

When the battery 30 is quickly charged using the charging device 2, the heating value of the power conversion unit 73 and the like becomes larger than usual charging. Therefore, the device is increased in size. When a charging device capable of quick charge is mounted on the battery-type forklift 1, the working hours of the battery-type forklift 1 may be decreased due to an increase in weight, in addition to the increase in size of the battery-type forklift 1 itself. Since, in the present embodiment, the charging device 2 is a stationary-type device, it is not necessary to mount the charging device capable of quick charge on the battery-type forklift 1. Therefore, the decrease in working hours due to the increase in size and weight of the battery-type forklift 1 is suppressed while the management of the battery 30 can be performed.

By the way, it can be considered to perform management of the battery 30 and prevention and maintenance of failure caused on the battery 30 using the stationary-type charging device 2. In this case, it is necessary to mount a communication device on the charging device 2. In the present embodiment, the in-vehicle control device 60 illustrated in FIG. 4 controls the charging device 2, and collects charging conditions of the battery 30 and information related to charging such as fitting failure of the charging connector 23 and the charging device-side connector 24, and the like. Then, the in-vehicle control device 60 can transmit the information related to the battery 30 using the out-of-vehicle communication device 64 to a management facility. In this way, in the battery-type forklift 1, the in-vehicle control device 60 executes control related to the charging of the battery 30, and collects the information related to the battery 30. Therefore, the management of the battery 30 and the prevention and maintenance of failure caused on the battery 30 can be performed using the out-of-vehicle communication device 64. As a result, it is not necessary to mount the communication device on the charging device 2.

In a case of managing the battery 30, the in-vehicle control device 60 collects, as the information for management, the number of charging, the number of completion of charging, the total discharged amount, a charged time, or a discharged time, for example, and transmits the collected information to the management facility through the out-of-vehicle communication device 64. In a case of managing the failure caused by the battery 30, the in-vehicle control device 60 collects a history of errors, for example, and transmits the information to the management facility through the out-of-vehicle communication device 64. In a case of preventing the failure caused by the battery 30, the in-vehicle control device 60 collects a history about suspension of charging due to occurrence of the fitting failure between the charging connector 23 and the charging device-side connector 24 and the like, and transmits the information to the management facility through the out-of-vehicle communication device 64.

As described above, the present embodiment has been described. However, the present embodiment is not limited by the above-described content. Further, the above-described configuration elements include things that can be easily conceived by a person skilled in the art, substantially the same, and so-called equivalents. Further, the above-described configuration elements can be appropriately combined. Further, various types of omission, replacement, and changes of the configuration elements can be performed without departing from the gist of the present embodiment.

REFERENCE SIGNS LIST

1 Battery-type forklift
2 Charging device
6 Alternating-current power source
10 Vehicle body
13 Fork
23 Charging connector
24 Charging device-side connector
30 Battery
31 Battery case
31F Fan
31B Lower part
31Hi Suction port
31SP Partition member
31B Bottom part
31R Frame
31T Upper part
31SF Side part
31He Exhaust port
32 Battery cell
32B Lower surface
32SL Side surface (large side surface)
32SS Side surface (small side surface)
32T Upper surface
32BT Terminal
34 Driver's seat
60 In-vehicle control device
61 Communication control device
62 Power source device
63 Startup circuit
64 Out-of-vehicle communication device
66 and 69 Contactor
67 Power line
67C Charging electric wire
68 Communication line
70 Control unit
71 Charging device power source
72 Startup signal generation unit
73 Power conversion unit
74 Sensor
76 Feeder line
76B Power line
77 Communication line

The invention claimed is:

1. A charging device for charging a battery of a work vehicle provided with the battery and at least one motor and a power source device and an in-vehicle control device, the motor being driven by power supplied from the battery, the power source device receiving power from the battery, the in-vehicle control device receiving power from the power source device to control an operation of the motor, the charging device comprising:
a power conversion unit configured to convert alternating-current power to direct-current power;
a control unit configured to control charging of the battery based on an instruction from an in-vehicle control device mounted on the work vehicle;
a feed terminal configured to supply the direct-current power to the battery;
a communication terminal for communicating with the work vehicle;
a startup terminal for transmitting a signal for starting up the in-vehicle control device;
a startup signal generation unit configured to generate a signal for starting up the in-vehicle control device provided in the work vehicle to transmit the signal to the power source device through the startup terminal; and
a charging device power source configured to transform power supplied from the battery of the work vehicle through the feed terminal to supply the transformed power to the control unit,
wherein the control unit is started upon receiving the supplying of the power from the charging device power source, and
wherein the in-vehicle control device starts charging by sending an instruction signal to the control unit upon receiving a startup-completion signal from the control unit.

2. The charging device according to claim 1, wherein the feed terminal, the communication terminal, and the startup terminal are arranged in a same connector.

* * * * *